United States Patent [19]

Ott

[11] Patent Number: 4,840,198

[45] Date of Patent: Jun. 20, 1989

[54] CONTROL VALVE

[75] Inventor: Helmut Ott, Stuttgart, Fed. Rep. of Germany

[73] Assignee: Herion-Werke KG, Fellbach, Fed. Rep. of Germany

[21] Appl. No.: 143,969

[22] Filed: Jan. 14, 1988

[30] Foreign Application Priority Data

Jan. 14, 1987 [DE] Fed. Rep. of Germany ....... 3700899

[51] Int. Cl.⁴ .............................................. F16K 11/04
[52] U.S. Cl. ............................ 137/625.64; 137/625.26
[58] Field of Search ................. 137/625.26, 625.27, 137/625.68, 625.66, 625.64, 596.16, 596.18

[56] References Cited

U.S. PATENT DOCUMENTS 1,679,614  8/1928  Lichtenberg ............... 137/625.27 X
1,921,092  8/1933  Newton ......................... 137/625.27
2,496,036 11/1950  Christensen .................. 137/625.26

Primary Examiner—Alan Cohan
Attorney, Agent, or Firm—Henry M. Feiereisen

[57] ABSTRACT

A directional control valve includes a housing with a pressure inlet port, two working ports and a vent port with one working port directly connected to the vent port and the other working port communicating with the vent port via a control piston. The control piston includes a sliding valve in the area of one working port and a seat valve in the area of the other working port. A throttle bush rotatably arranged in the housing and a throttle screw rotatable relative to the throttle bush cooperate with the control valve to modify and throttle separately and independently from each other the cross sectional ventilating areas for the working ports.

12 Claims, 4 Drawing Sheets

4,840,198

CONTROL VALVE

BACKGROUND OF THE INVENTION

The present invention refers to a control valve, and in particular to a directional control valve.

A control valve of this type, especially for electropneumatic control, includes a housing with a pressure inlet port, two working ports and a vent port and accommodates a control valve wherein one working port is directly connectable to the vent port while the other working port is connectable to the vent port via the control valve.

It is known to design directional control valves of this type as sliding valves. Sliding valves with soft seals have, however, a great friction. On the other hand, seat valves are of considerable dimension and complicated structure. In general, these valves are characterized by assigning a vent to each working port. Although directional control valves have been proposed in which only one vent is provided for both working ports, such control valves do not allow to vent both working ports separately and independently from each other.

SUMMARY OF THE INVENTION

It is thus one object of the present invention to provide an improved control valve obviating the aforestated drawbacks.

This object and others which will become apparent hereinafter are attained in accordance with the present invention by providing a control valve which is designed as a sliding valve in the area of one working port and as a seat valve in the area of the other working port. Suitably the one working port is vented through the valve seat of the opened seat valve.

The provision of such a control valve allows the ventilation of the working ports to be throttled independently from each other. The control valve is of compact construction for a given sectional area of flow and is characterized by a small friction.

According to a further feature of the present invention, the control piston is provided with a cylindrical projection which extends through the valve seat upon opened seat valve so as to close a portion of the opening area of the valve seat while the remaining portion of the opening area is adjustable by a rotatable throttle bush. Preferably, the remaining portion of the valve opening area of the valve seat is semi-annular and cooperates with a semi-annular collar of the throttle bush. Upon rotation of the throttle bush, the semi-annular collar slides over the remaining portion of the valve opening area to throttle the ventilation of the respective working port accordingly.

The other working port of the control valve is vented via a transverse bore and longitudinal bore with the outlet of the latter throttleable by the throttle bush and a throttle screw which is rotatable relative to the throttle bush. The throttle bush and the throttle screw are each provided with an axial semi-annular collar so as to seal the outlet of the longitudinal bore in circumferential direction thereof by rotating the throttle screw and thus the pertaining semi-annular collar relative to the semi-annular collar of the throttle bush.

BRIEF DESCRIPTION OF THE DRAWING

The above and other objects, features and advantages of the present invention will now be described in more detail with reference to the accompanying drawing in which.

DESCRIPTION OF PREFERRED EMBODIMENTS

Figure 1:
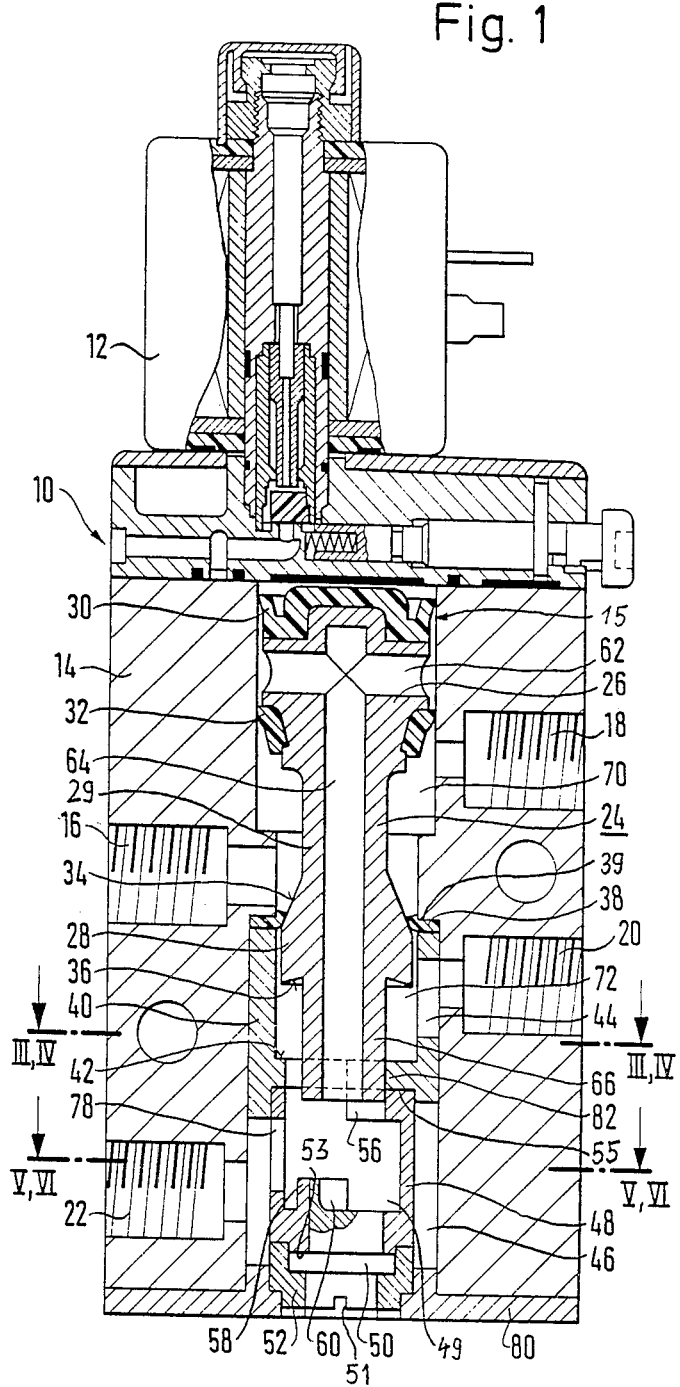
FIG. 1 is a cross sectional view of one embodiment of a directional control valve in accordance with the present invention in one operative position.

FIG. 1 shows in cross sectional view one embodiment of a directional control valve generally designated by reference numeral 10 and actuated by an electromagnetically operable pilot valve 12 which does not form subject matter of the present invention and thus is not described in detail.

The control valve 10 comprises a housing 14 which includes an inlet port 16 and a vent or return port 22 at one side thereof and two working ports 18, 20 which are arranged at the opposite side thereof and cooperate with the common vent port 22.

The housing 14 includes a longitudinal bore 15 which is axially divided in sections to define a chamber 70 in communication with the working port 18 and a chamber 72 communicating with the working port 20 via a transverse bore 44 of a valve bush 40 which surrounds the chamber 72 and whose purpose will be described furtherbelow. Guided for axial displacement in the longitudinal bore 15 is a control valve 24 which includes a sliding valve 26 housed in the chamber 70 and a seat valve 28 accommodated in the chamber 72. As shown in FIG. 1, the sliding valve 26 and the chamber 70 have a diameter exceeding the diameter of the seat valve 28 and the chamber 72.

The seat valve 28 is provided with a conical surface 34 tapering toward a straight section 29 integrally connecting the seat valve 28 with the sliding valve 26.

At its upper end, the sliding valve 26 is provided with a transverse bore 62 which is in communication at a central area thereof with a longitudinal bore 64 extending through the entire control valve 24 in axial direction thereof and communicating with the vent port 22.

In order to seal the sliding valve 26 against the inside wall of the chamber 70, suitable seals 30 and 32 are axially spaced and provided at each side of the transverse bore 62. Sandwiched between the top of the valve bush 40 and a suitable shoulder 39 of the housing 14 is a further seal 38 which cooperates with the conical surface 34 of the seat valve 34 and is of sufficient flexible material to allow bending thereof by the conical surface 34 when the control valve 24 is moved upwardly into the position as shown in FIG. 1.

Figure 3:
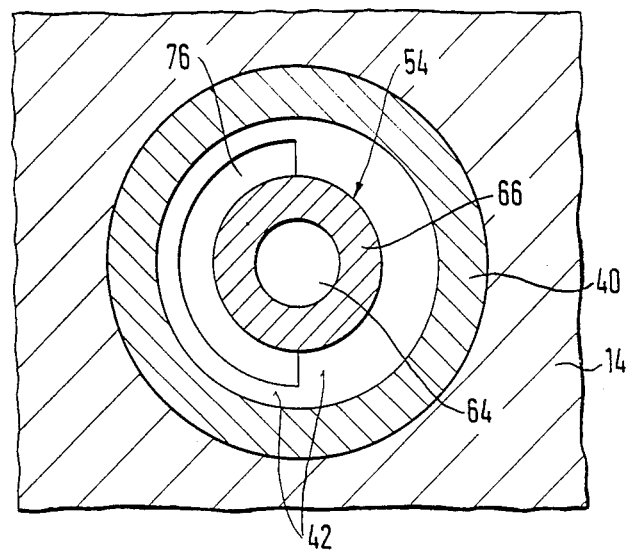
FIG. 3 is a cross sectional view of the directional control valve taken along the line III—III in FIG. 1 in non-throttled position.

The valve bush 40 is suitably retained in the housing 14 against axial displacement and rotation. At its lower axial end, the valve bush 40 is provided with a transverse intermediate wall 82 which defines a valve seat 42 with a valve opening area 54 (FIG. 3). The valve seat 42 cooperates with the axial end face 36 of the seat valve 28. As shown e.g. in FIG. 3, the intermediate wall 82 is not of uniform ring-shape but includes a semi-annular cutout for defining a ventilating area 76 the purpose of which will be described further below.

Coaxial to the valve bush 40 is a throttle bush 48 rotatably supported in the housing 14 and slightly disposed with one axial end which faces the seat valve 28 in a recess of the valve bush 40 for proper guidance. With this respective end face, the throttle bush 48 is butt jointed to the intermediate wall 82 of the valve bush 40.

The throttle bush 48 defines an interior space 49 which communicates via a transverse bore 78 with an annular space 46 disposed outside the throttle bush 48 between the latter and the surrounding housing 14 and connected with the vent port 22. Inserted in the lower axial end of the throttle bush 48 remote to the valve bush 40 is a coaxial throttle screw 50 which is rotatable relative to the throttle bush 48. The throttle bush 48 and the throttle screw 50 are accurately kept in position relative to each other by a retainer ring 52 which in turn is held by a lid 80. It will be appreciated that any other suitable means of holding the retainer ring 52 in position may be employed, for example by screwing the retainer ring 52 directly into the housing 14.

At its end facing the control valve 24, the throttle bush 48 is provided with a semi-annular collar 56 by which the valve opening area 54 of the valve seat 42 is throttled and thus controllable. In similar manner, the other end of the throttle bush 48 is provided with a semi-annular collar 58 axially directed toward the control valve 24 and offset by e.g. 180° relative to the collar 56 in the illustrated embodiment as shown in FIG. 1.

The throttle screw 50, too, is provided with a semi-annular collar 60 which is axially directed toward the control valve 24 and rotatable relative to the collar 58 by turning the throttle screw 50 e.g. with a suitable tool engaging the slot 51 of the screw 50.

Figure 2:
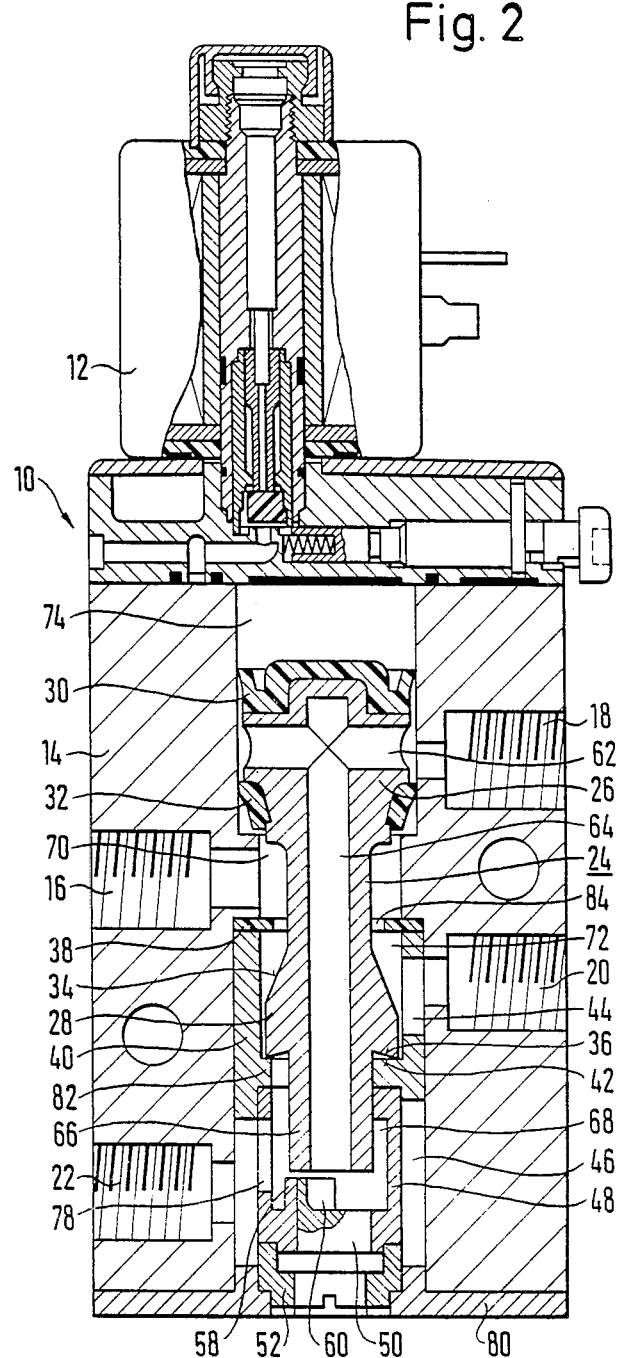
FIG. 2 is a cross sectional view of the directional control valve according to FIG. 1 in another operative position.

As is further shown in FIG. 1, the control valve 24 is further provided in prolongation of the seat valve 28 with a cylindrical projection 66 which in each position of the control valve 24 protrudes through the valve opening area 54 of the valve seat 42 as illustrated in FIGS. 1 and 2 showing the two operative positions. The cylindrical projection 66 is of smaller diameter than the inner diameter of the interior space 49 of the throttle bush 48 so that an annular space 68 is defined in the interior space 49 as shown in particular in FIG. 2.

After having described the elements of one embodiment of a control valve in accordance with the present invention, the mode of operation will now be described in more detail.

In the operative position as shown in FIG. 1, the control valve 24 is vented via the pilot valve 12. Pressure fluid, e.g. air, supplied through the inlet port 16 urges the control valve 24 into the position as shown in FIG. 1 since the diameter of the sliding valve 26 exceeds the diameter of the seat valve 28 so that the pressure fluid flows via chamber 70 to the working port 18. The other working port 20 is connected for ventilation with the vent port 22 via the transverse bore 44, the chamber 72, the valve opening area 54 of the valve seat 42, the interior space 49 of the throttle bush 48, the transverse bore 78 and the annular space 46.

The control valve 24 is thus in its upper position in which the conical surface 34 coacts with the seal 38 to bend the latter so as to choke off the connection between the chamber 70 and the chamber 72. Further, the seal 32 prevents a connection between the chamber 70 and the transverse bore 62.

When actuating the pilot valve 12, pressure fluid is admitted to the space 74 (FIG. 2) over the top side of the sliding valve 26 to develop the force needed to thrust the the control valve 24 into the position as shown in FIG. 2. Pressure fluid flows from inlet port 16 through the chamber 70 and through the now open valve seat 84 into the chamber 72 and eventually through transverse bore 44 to the working port 20. The seal 32 prevents a connection between the inlet port 16 and the working port 18 which is now connected for ventilation with the vent port 22 via transverse bore 62, the longitudinal bore 64 in control valve 24, the interior space 49 of throttle valve 48, transverse bore 78 and annular space 48.

The manner of throttling the sectional ventilating area of both working ports 18 and 20 separately and independently from each other will now be described with reference to FIGS. 3 to 6.

Figure 4:
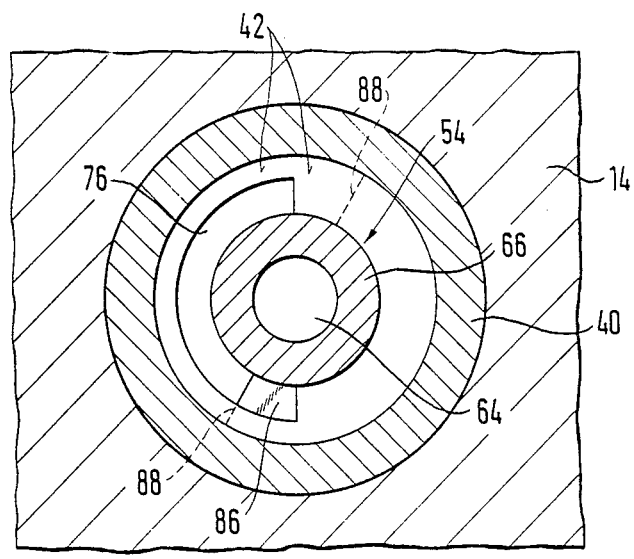
FIG. 4 is a cross sectional view of the directional control valve taken along the line IV—IV in FIG. 1 in throttled position.

FIGS. 3 and 4 illustrate the ventilation through and throttling of the valve opening area 54 of the seat valve 28. The valve opening area 54 is defined by the circular area of the cylindrical projection 66 of the control valve 24 plus the semi-annular ventilating area 76. When the seat valve 28 is closed as shown in FIG. 2, the sealing end face 36 rests on the valve seat 42 and the valve opening area 54 is thus closed. When opening the seat valve 28 as shown in FIG. 1, then the valve opening area 54 is partly closed by the cylindrical projection 66, however, the semi-annular ventilating area 76 is open and still available for ventilation of the working port 20.

Throttling of the valve opening area 54 is obtained by rotating the throttle bush 48 relative to the valve bush 40 so that the collar 56 is shifted over the semi-annular area 76 to cover the latter to a desired degree. FIG. 4 shows the throttling of the semi-annular area 76, and it can be recognized that the collar 56 is moved over the semi-annular area 76 by a portion 86 which thus defines the throttled area. The position of the collar 56 is indicated by broken line 88. Consequently, the throttling degree for ventilation of the working port 20 can be modified in a desired manner by appropriate rotation of the throttle bush 48.

Figure 5:
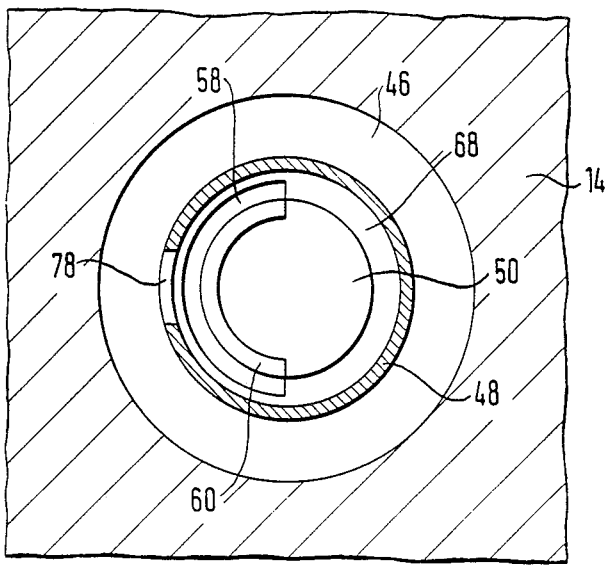
FIG. 5 is a cross sectional view of the directional control valve taken along the line V—V in FIG. 1 in non-throttled position.

In the operative position of FIG. 2, the seat valve 28 is closed so that the inlet port 16 is connected with the working port 20 while the working port 18 is vented via transverse bore 62 and longitudinal bore 64 which communicates with the interior space 49 of the throttle bush 48. By comparison of FIGS. 5 and 6, the throttling of the outlet of the longitudinal bore 64 toward the interior space 49 of the throttle bush 48 will be readily recognizable. FIG. 5 shows the position which corresponds to the position of the control valve in FIG. 2, and it can be seen that the outlet of the longitudinal bore 64 is not throttled yet. Thus, the pressure air can exit through the outlet of the longitudinal bore 64 and flow via the annular space 68 and transverse bore 78 and annular space 46 to the vent port 22.

Figure 6:
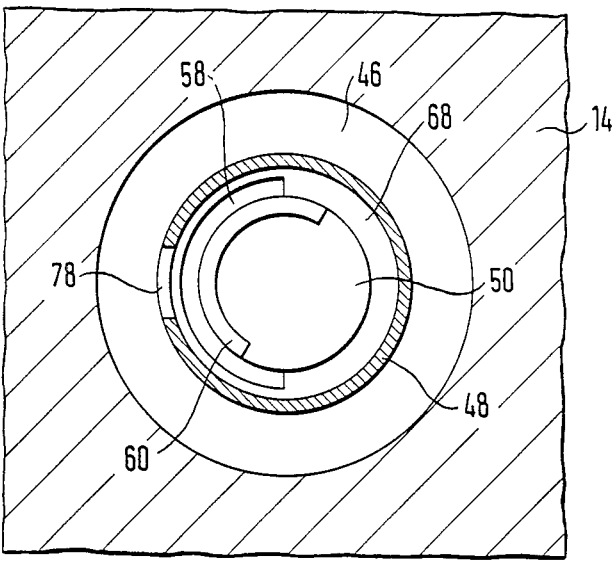
FIG. 6 is a cross sectional view of the directional control valve taken along the line VI—VI in FIG. 1 in throttled position.

By turning the throttle screw 50 relative to the throttle bush 48, the semi-annular collar 60 is rotated relative to the semi-annular collar 58 so that the outlet of the longitudinal bore 64 is covered at its circumferential area to a higher degree by the collars 58 and 60 as the cross sectional area of the outlet is reduced as shown in FIG. 6. Consequently, the cross sectional area through which the pressure fluid can flow to the interior space 49 and annular space 68 is reduced. By rotating the collar 60 of the throttle screw by 180° relative to the collar 58, the outlet of the longitudinal bore 64 is closed along its entire circumference so that the pressure fluid is prevented from escaping except for some small gaps required for tolerance purposes.

Thence, by rotating the collar 60 of the throttle screw 50 relative to the collar 58 of the throttle bush 48, the sectional ventilation area of the working port 18 can be modified and throttled to a desired degree.

The throttle screw 50 and the throttle bush 48 are rotatable separately and independently from each other and retained in their respectively set position by suitable means e.g. by providing the adjoining end faces of the throttle screw 50 and the throttle bush 48 with a respective grooving or serration engaging each other as indicated at 53. In similar manner, the adjoining end faces 55 of the valve bush 40 and the throttle bush 48 are provided with a respective grooving or serration engaging each other so that the throttle bush 48 is locked relative to the valve bush 40 after being rotated into the desired position. For ease of illustration, the groovings or serrations along the adjoining end faces of the throttle bush 48 with the valve bush 40, on the one hand, and with the throttle screw 50, on the other hand is not shown in detail.

When it is desired to reposition the throttle bush 48 or the throttle screw 50, the control valve 24 is switched off and the retainer ring 52 is loosened. The throttle screw 50 is removed to allow access to the throttle bush 48 which then can manually be turned relative to the valve bush 40. Once the desired position is obtained, the throttle screw 50 is reinserted either in the same position or in a different position relative to the throttle bush 48. In the event, the throttle bush 48 and the throttle screw 50 are to be rotated simultaneously in the same direction, it is sufficient to slightly loosen the retainer ring 52 so as to allow the throttle screw 50 to be rotated by means of a screw driver inserted in slot 51. Since the throttle bush 48 is connected in form-locking manner with the throttle screw 50 along the adjoining end faces, the rotation of the throttle screw 50 is transmitted to the throttle bush 48 which is thus simultaneously turned.

The connection between the throttle screw 50 and the throttle bush 48 may, however, be attained also in a different manner e.g. through frictional engagement by axially pressing the throttle bush 48 and the throttle screw 50 against each other and against the valve bush 40 by means of the retainer ring 52 and the lid 80.

While the invention has been illustrated and described as embodied in a Directional Control Valve, it is not intended to be limited to the details shown since various modifications and structural changes may be made without departing in any way from the spirit of my present invention.

What is claimed as new and desired to be protected by Letters Patent is set forth in the appended claims.

I claim:

1. A directional control valve unit; comprising:
   a housing having fluid inlet means, fluid outlet means including two working ports, and vent means with one working port directly connectable to said vent means;
   valve means including a control valve via which said other working port is connectable with said vent means, said control valve being accommodated in said housing and having one section in form of a seat-type valve in the area of said one working port and another section in form of a sliding-type valve in the area of said other working port; and
   throttle means for controlling ventilation of said fluid outlet means and including a throttle bush rotatably arranged in said housing and cooperating with said valve means.

2. A control valve unit as defined in claim 1, and further comprising a valve seat ring cooperating with said seat-type valve, said control valve further including a cylindrical projection protruding continuously through said valve seat ring of said seat-type valve, said valve seat ring defining a valve opening area which at opened seat-type valve is partly closed by said cylindrical projection and includes a remaining portion the cross sectional area of which being adjustable by said throttle bush for throttling ventilation of said one working port.

3. A control valve unit as defined in claim 2 wherein said remaining portion of said valve opening area of said valve seat ring is of semi-annular shape, said throttle bush including a respective semi-annular collar which upon rotation of said throttle bush covers and throttles said semi-annular remaining portion of said valve opening area.

4. A control valve unit as defined in claim 1 wherein said control valve includes a transverse bore and a longitudinal bore communicating with said transverse bore for allowing ventilation of said other working port, said longitudinal bore having an outlet defining a cross sectional area wherein said throttle means throttles said outlet of said longitudinal bore by suitably covering said cross sectional area so as to control ventilation of said other working port.

5. A control valve unit as defined in claim 4 wherein said throttle means further includes a throttle screw rotatable relative to said throttle bush, said throttle bush and said throttle screw each being provided with an axial semi-annular collar so that said outlet of said longitudinal bore is closable and throttleable in circumferential direction upon rotation of said throttle screw relative to said throttle bush.

6. A control valve as defined in claim 5, and further comprising fastening means arranged in said housing for centrally retaining said throttle screw in said throttle bush, said semi-annular collars of said throttle bush and said throttle screw being disposed axially opposite to said outlet of said longitudinal bore.

7. A control valve unit as defined in claim 6 wherein said fastening means includes a retainer ring which maintains the position of said throttle bush relative to said throttle screw and allows adjusting of said throttle bush and said throttle screw independently from each other.

8. A control valve unit as defined in claim 7 wherein said throttle bush and said throttle screw are locked to each other in each position in force-locking manner by axial pressure exerted by said retainer ring.

9. A control unit as defined in claim 5 wherein said throttle bush and said throttle screw are locked to each other in each position in form-fitting manner by providing the adjoining end faces of said throttle bush and said throttle screw with engaging serrations.

10. A control valve unit as defined in claim 2, and further comprising a valve bush fixedly arranged in said housing and defining said valve seat ring, said valve bush having a recess for coaxially receiving said throttle bush.

11. A control valve unit as defined in claim 10 wherein said valve bush defines a chamber for said seat-type valve, and further comprising sealing means including a seal sandwiched between said valve bush and said housing, said seat-type valve including a conical surface tapered in direction toward said slide valve and cooperating with said seal for sealing said chamber when said one working port is in communication with said vent means.

12. A control valve unit as defined in claim 11 wherein said seal is of flexible material to allow bending thereof when acted upon by said conical surface of said seat valve.

* * * * *